United States Patent [19]

Brown et al.

[11] 4,423,119

[45] Dec. 27, 1983

[54] COMPOSITE WIRE FOR FORMING WEAR RESISTANT COATINGS, AND METHOD OF MANUFACTURE

[76] Inventors: Roger K. Brown, 16300 N. Park Dr., Apt. 1011, Southfield, Mich. 48075; Charles K. Deak, 29844 Wagner, Warren, Mich. 48093

[21] Appl. No.: 318,881

[22] Filed: Nov. 5, 1981

[51] Int. Cl.$^3$ ............................................... B22F 5/00
[52] U.S. Cl. ................................. 428/558; 428/368
[58] Field of Search .................... 428/558, 553, 368

[56] References Cited

U.S. PATENT DOCUMENTS

| | | | |
|---|---|---|---|
| 1,999,888 | 4/1935 | Ammann | 428/558 |
| 3,549,338 | 12/1970 | Sterenbogen et al. | 428/558 |
| 4,048,705 | 9/1977 | Blampain et al. | 428/558 |

FOREIGN PATENT DOCUMENTS 932342 8/1973 Canada .
354961 11/1972 U.S.S.R. .

*Primary Examiner*—Brooks H. Hunt
*Assistant Examiner*—Anne Brookes
*Attorney, Agent, or Firm*—Reising, Ethington, Barnard, Perry & Milton

[57] ABSTRACT

The composite wire of the present invention has a malleable metal sheath swaged around a core formed of a uniform particulate mixture including titanium, preferably as an alloy thereof containing at least 65% by weight titanium, and carbon, the amount by weight of titanium present being from about 8 to 24% of the total weight of all the metal in the composite wire and the amount of carbon present in the mixture being at least sufficient to react with substantially all of the titanium to form titanium carbide.

13 Claims, 3 Drawing Figures

COMPOSITE WIRE FOR FORMING WEAR RESISTANT COATINGS, AND METHOD OF MANUFACTURE

TECHNICAL FIELD

The subject matter of the present invention is a composite wire which upon heating and application to a work surface results in the deposit on the surface of a wear resistant coating containing titanium carbide in a metal matrix. The term "wire" is used herein generically to mean either a bendable relatively small diametered structure or a structure which by reason of its greater diameter or greater rigidity could appropriately be termed as a rod.

BACKGROUND ART

Wear resistant coatings consisting of titanium carbide dispersed in a metal matrix are well known in the art. It is also known in the art that such wear resistant coatings can be formed by heating a combination of carbon, titanium and other metal to a temperature at which the titanium and carbon react to form the titanium carbide in situ as a dispersed phase in the matrix formed by the other metal as it melts. One manner of accomplishing such a wear resistant coating is to form a particulate mixture of carbon and titanium, form a wire of the other metal and then heat the wire and mixture simultaneously while in contact with each other. It is also known to use a binder for the mixture and to coat the mixture onto the wire so as to provide the contact between the mixture and the wire. Still further, it is known that titanium alloys can be used to supply the titanium to the mixture.

It is also known that weld wires and the like can be made of composite structure, with a core of one composition surrounded by a jacket of another composition. But where such composite wire is used it is generally a matter of indifference as to which metal forms the core and which metal forms the jacket. In the case of composite welding wires or soldering wires wherein the combination is a metal and a flux, sometimes the jacket is the flux and sometimes the core is the flux.

BRIEF DESCRIPTION OF THE INVENTION

Briefly, the present invention in its broadest scope stems from our discovery that for optimum efficiency and results in the application of wear resistant coatings of titanium carbide dispersed in a metal matrix, it is necessary not only to form the titanium carbide in situ but to provide the required titanium and carbon as components of a compacted particulate mixture surrounded and confined by a metal sheath which supplies metal for the metal matrix. Using such structure the interaction and interrelationship between the compacted mixture containing the carbon and titanium, which forms the core, and the surrounding metal sheath which confines and compacts the core provides the improved efficiency and results. That is, when the end of the wire having such composite structure is heated to the temperature at which the titanium reacts with the carbon to form the titanium carbide, the combination of the heat applied and the heat generated by the exothermic reaction melts the sheath and forms the matrix; however such reaction and melting progress at equal rate and the sheath while yet solid and as it is melted serves to confine the core mixture and the reaction of the titanium and the carbon to the end that substantially all the titanium reacts with the carbon and substantially all the carbon reacts with the titanium or is otherwise retained by the metal of the wire rather than reacting with oxygen in the ambient atmosphere.

Further in accordance with the invention, to enable efficient and relatively low cost manufacture of the composite wire, the sheath is of a metal sufficiently malleable to enable it to bend and be swaged around and against the particulate core mixture with relative ease, and the core mixture contains, in addition to the carbon and titanium, one or more other metals which alloy with the sheath metal to provide a metal matrix for the titanium carbide having the hardness and other matrix properties desired.

Hence, the composite wire with its swaged sheath can be efficiently manufactured and yet with the resulting weld deposit from the composite wire being excellent in all respects. In the preferred embodiments the titanium is included in the core mixture as a friable alloy thereof, such alloy thereby being reducible to the small particle size required for the core mixture with relative ease and such alloy being the source for at least some of the metal for alloying with the sheath metal to form the matrix for the wear resistant coating. The preferred titanium alloys are those containing at least 65% titanium and it is best that the alloy used contain iron and chromium, the former largely contributing to the friability of the alloy and the latter largely contributing to the properties of the matrix of the wear resistant coating. In one preferred embodiment the sheath is formed of metal which is initially of relatively low hardness but which during manufacture of the composite wire is work hardened to a greater hardness by reason of the bending, swaging and stretching of the sheath metal during wire manufacture to the end that the composite wire is relatively stiff and easily manageable when used even though the sheath metal was initially relatively soft to expedite manufacture of the wire. Further, in this and other of the preferred embodiments the sheath metal can be of relatively low carbon content but receptive to an increased carbon content, and increased hardness, during formation of the wear resistant deposit, the core mixture being formulated to provide not only the carbon necessary to react with all of the titanium but also that necessary to provide the increased carbon content to the sheath metal and hence to the matrix of the deposit.

Because the core mixture is confined by the sheath, there is relatively little reaction of the core mixture ingredients with the ambient atmosphere. Hence, because of the core confinement and reaction control afforded by the sheath, the core mixture can be formulated, and the weight ratio thereof to the sheath can be selected, so as to provide the precise hard surface coating chemistry desired including, very importantly, the ratio of the amount of dispersed titanium carbide phase and the amount of matrix metal resulting from the composite wire. In short, uncontrolled losses of the ingredients to the ambience being minimized, there is increased control with respect to the composition of the hard surface coating deposited, such control being exercisable by the formulation of the core mixture and the weight ratio thereof to the sheath metal.

As indicated above, in the most preferred embodiments of the invention the titanium in the core mixture is present as a titanium-iron-chromium alloy containing at least about 65% by weight titanium, the carbon being included as such, i.e. as elemental carbon. The amount of carbon included in the core mixture is such as to supply that stoichiometrically required to react with all of the titanium to form titanium carbide, i.e. about one part by weight carbon for each four parts by weight titanium, plus such additional carbon as desired to increase the carbon content of the matrix beyond that furnished by the carbon content of the sheath metal. A slight overage of carbon in an amount of up to about 5% (by weight) of the amount calculated to be required in accordance with the above is satisfactory and serves to no disadvantage; however, the presence of carbon in excess of this is not only unnecessary but undesirable. Because the sheath confines the core mixture and its reaction, there is no requirement to include excess carbon for reaction with oxygen in the ambience. It is better to the overall metallurgy of the deposited coatings that the composite wire be slightly carbon poor than that it be greatly carbon rich. Hence for optimum results the amount of carbon included should be that calculated in accordance with the above (i.e. the amount stoichiometrically required to react with all the titanium plus the amount, if any, desired to be imparted to the matrix), plus or minus only up to about 5%.

As has been stated, the metal present in the core mixture, other than the titanium, alloys with the sheath metal and hence forms a part of the resulting metal matrix in which the titanium carbide, formed in situ, is dispersed. Hence, precise choice of the thickness and weight of the metal sheath and the ratio thereof with the core mixture depends on the chemistry desired for the hard surface coating to be applied and on the amounts of metals, other than titanium, included in the core mixture. However, in all preferred embodiments of the invention the amount by weight of the titanium in the core mixture is from about 8 to 24% of the amount by weight of all the metal in the composite wire, i.e. the total of all the metal in the sheath and in the core mixture. To state this another way, taking into account that the titanium and carbon react in a weight ratio of about 4 to 1, the amount of titanium present preferably should be such as to result in a wear surface coating wherein the dispersed titanium carbide phase constitutes from about 10 to 30% by weight of the coating, the amount of carbon present being such as to supply the carbon required for the formation of the titanium carbide plus any desired for increasing the carbon content of the matrix.

The coatings provide excellent wear resistant properties and can be deposited easily and controllably by means of the composite wire.

BEST MODE FOR PRACTICING THE INVENTION

Figure 1:
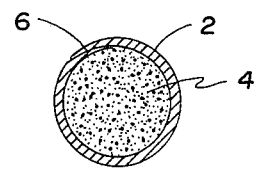
FIG. 1 is a cross section, in enlarged scale, of a composite wire made in accordance with the invention.

The most preferred titanium alloys for the practice of the invention are those containing, by weight, about 65 to 90% titanium, about 2 to 15% chromium and about 5 to 20% iron. The alloy is pulverized to a small particle size, preferably from about 60 to 150 mesh Tyler. Because the alloys are friable this can be accomplished by conventional crushing and milling operations with relative ease.

The carbon can be added as carbon black or graphite, the latter being much preferred, for one reason because of greater ease in handling. Like the alloy, the graphite should be of small mesh size, again preferably from about 60 to 150 mesh Tyler.

The core composition can, if desired, be formulated to contain metals in addition to the titanium alloy, the choice or absence of such additional metals depending on the choice of the sheath metal and the alloy composition desired for the matrix of the wear resistant coating to be deposited. Likewise, the choice of the precise titanium alloy used will depend on these factors, keeping in mind that all of the metals in the core composition other than the titanium will be present in the matrix of the coating deposited. It should be mentioned, however, that in making the titanium alloy it is not required that pure or even commercially pure titanium be used as the source of the titanium; scrap titanium alloy (typically containing 80% or more titanium and the remainder aluminum, typically in an amount up to about 8%, plus small amounts of one or more of vanadium, molybdenum, zirconium, chromium and manganese) can be used to make the friable titanium alloy used in the core mixture without disadvantage and with the advantage of lower cost. Hence, the titanium alloy used can contain metals in addition to chromium and iron though, to obtain maximum advantage from the use of the preferred alloys it is best that the other metals not be present in excess of about 5%. Likewise the core composition can contain chromium or iron in addition to that furnished by the titanium alloy used. Where metals in addition to the titanium alloy are used in the core composition the additional metals should, of course, also be in particulate form, preferably of about the same mesh size as the titanium alloy. It is best that the core composition not contain more than a minor amount, less than 1%, of silicon.

The following specific example will serve to illustrate:

EXAMPLE 1

Sheath:
Stainless steel containing 18% (all percentages herein are by weight) chromium, 8% nickel, 1% manganese, 0.1% carbon, remainder iron.

Core Composition:
14% carbon (graphite), 6% nickel, 6% chromium, 74% titanium alloy, the alloy containing 75% titanium, 5% chromium, 10% iron, 6% aluminum and 4% vanadium.

Sheath to Core Weight Ratio:
70% sheath, 30% core.

Metal Matrix To Titanium Carbide Weight Ratio In The Resulting Wear Resistant Coating:
Matrix metal 79%, titanium carbide 21%.

In the above Example 1. substantially all of the carbon included is for reaction with the titanium.

As has already been indicated, in proportioning the amount of carbon, titanium and other metals used in the core composition and the ratio thereof to the sheath metal, it is preferred that the proportions and ratio be such as to provide the resulting wear resistant coating, a titanium carbide content of from about 10 to 30%, the above example being in about the middle of the range.

Also, in all instances it is preferred that the sheath metal constitute at least 50% and not more than 85% of the weight of the composite wire.

The sheath can be selected from a wide variety of metals and metal alloys, principal among them being the iron base alloys and the nickel base alloys. In all instances, however, it is preferred that the sheath not contain more than a minor amount, less than 1%, of titanium or silicon. The following are typical of metals which can be used for the sheath: low carbon (mild) steels, ferritic stainless steels, austenitic stainless steels, Inconel.

Since the constituents required for the desired matrix metal of the coatings can be supplied by metals included in the core composition in addition to those included as constituents of the titanium alloy, the sheath metal can be selected with a view to ease in bending and swaging the sheath in the manner hereinafter described, and the titanium alloy can be selected with a view to ease in reducing it to small particle size. In this context, the stainless steels and the low carbon steels are generally excellent for the sheath and the titanium-iron-chromium alloys within the ranges set forth above are excellent for providing the required titanium to the core composition.

For ease in forming and swaging the sheath around the core mixture it is preferred that the metal used for the sheath have an initial hardness not exceeding 100, and best that it be below 90, on the Rockwell B Scale. By "initial" hardness is meant the hardness of the metal prior to the sheath forming and swaging operations. After completion of the sheath forming and swaging operations, high sheath malleability serves to no advantage but instead can serve to some disadvantage since relatively high wire rigidity is generally useful in the control of wire feed and positioning during use of the wire in depositing the wear resistant coatings. Hence, there is advantage in using for the sheath a metal which has an initial hardness of no more than 100, and preferably less than 90, on the Rockwell B Scale but which is then work hardened to greater than its initial hardness during and by way of the sheath forming and swaging operations. Typical of metals which fall into this category are the low carbon steels and the stainless steels.

As has already been indicated, the matrix of the wear resistant coatings deposited from the composite wire will be an alloy of the sheath metal and the other metal, other than the titanium, included in the composite wire as components of the core mixture, including the components, other than the titanium, of the titanium alloy used. Hence, the matrix of the wear resistant coatings can have a hardness greater than that of the metal used to form the sheath. Further in this regard, it is often desired that the wear resistant coating desired to be deposited have a matrix of a carbon content higher than that afforded by just the carbon content of the sheath metal, keeping in mind that a high carbon content sheath metal is often incompatible with the desired feature of using a sheath metal which can be bent and swaged with relative ease. To increase the carbon content of the matrix metal the amount of carbon included in the core mixture is increased, beyond that stoichiometrically required to react with all of the titanium, to the extent required to provide the desired increased carbon content of the matrix.

The following additional examples will serve to further illustrate:

EXAMPLE 2

Sheath:
Stainless steel containing 12% chromium, 1% manganese and 0.1% carbon, remainder iron.
Core Composition:
20.5% carbon (graphite), 1.75% molybdenum, 1.75% vanadium, and 76% titanium alloy containing 85% titanium, 5% chromium, 10% iron.
Sheath To Core Weight Ratio:
66% sheath, 34% core.
Metal Matrix To Titanium Carbide Weight Ratio In The Resulting Wear Resistant Coating:
Metal matrix 72.5%, titanium carbide 27.5%.

In this Example 2. the total carbon in the core is about 7% of the total weight of the wire and of this 7% 5.5% is for reaction with the titanium and the remaining 1.5% is for carbon enrichment of the matrix.

EXAMPLE 3

Sheath:
Inconel (75% nickel, 16% chromium, 8% iron, 1% manganese).
Core Composition:
16% carbon (graphite) and 84% titanium alloy containing 70% titanium, 5% chromium, 10% iron, 5% nickel, 6% aluminum, 4% vanadium.
Sheath To Core Weight Ratio:
84% sheath, 16% core.
Metal Matrix To Titanium Carbide Weight Ratio In The Resulting Wear Resistant Coating:
Metal matrix 88%, titanium carbide 12%.

In this Example 3., just as in Example 1., substantially all of the carbon included is for reaction with the titanium.

The composite weld wire is best manufactured using a narrow strip of sheet stock as the starting material for the sheath, the narrow strip being progressively bent to a trough shape, the uniformly mixed core composition in particulate form then being metered into the trough and with the sheath then being further progressively bent to swage it around and against the core. Such progressive drawing, bending and swaging of the sheath can be by way of pulling it through sets of rollers, or through progressively smaller die openings, as well known in the metal tube forming and swaging arts. As the sheath is progressively formed from the flat strip to its final generally cylindrical shape, the drawing of the strip through the progressive rollers or other dies generally results in a reduction in the thickness of the strip and hence, knowing the thickness of the final sheath desired, the thickness of the strip stock used as the starting material can be selected as required taking into account the reduction in thickness resulting from the sheath forming operation.

The drawings show the preferred cross-sectional shapes for the sheath and composite wire. In the FIG. 1 embodiment the sheath 2 is bent to cylindrical shape, surrounding and compacting the core 4, with an overlap 6 of the bent sheath strip along one axial side of the composite wire. During sheath formation the overlapped edges of the metal strip used as the starting material for the sheath are bent against each other and are somewhat deformed, as shown, resulting in a substantially cylindrical exterior wire surface. To illustrate the reduction in sheath thickness occurring during manufacture, the composite wire shown in FIG. 1 has an external diameter of 3/32" with a sheath thickness of about 0.009"; however, the initial thickness of the metal strip from which the sheath was formed was 0.011".

Figure 2:
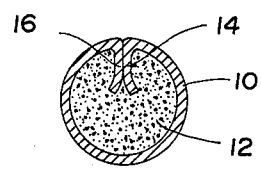
FIG. 2 is a cross-sectional view, in enlarged scale, of another composite wire made in accordance with the invention.

In the FIG. 2 embodiment the sheath 10 is likewise drawn and bent to cylindrical shape, surrounding and compacting the core 12, but in this embodiment with the edges 14 and 16 of the metal strip being bent radially inwardly into curled abutting contact with each other as shown.

Figure 3:
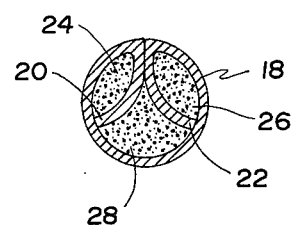
FIG. 3 is a cross-sectional view, in enlarged scale, of still another composite wire made in accordance with the invention.

In the FIG. 3 embodiment the cross-sectional configuration resulting from the sheath forming and swaging operations is similar to that of FIG. 2 but with the edges of the metal strip 18 being curled further inwardly and into contact with the interior wall of the sheath thereby dividing the wire into three axially extending compartments 24, 26 and 28 each filled with the compacted core mixture.

When used to provide the wear resistant coating it is necessary that the end of the composite wire be heated intensely against or adjacent the surface to be coated so as to cause the reaction between the titanium and the carbon to form the titanium carbide and so as to melt the sheath and other metal in the wire to form the matrix. To best accomplish this the composite wire itself can be used as the electrode in an arc welding operation or the wire can be inserted into the arc stuck between two electrodes of an arc welding operation. Alternatively the heat can be imparted to the end of the composite wire by a welding torch. It will be understood, of course, that depending on the welding operation used and the duration and extent thereof, the metal of the workpiece being coated may form a part of the matrix of the coating; however, it is best that the welding operation be such that the matrix of the wear resistant coating be predominantly that resulting from the composite wire.

It will be understood that while the invention has been described with reference to preferred embodiments various changes and modifications may be made all within the full and intended scope of the claims which follow.

What is claimed is:

1. A composite wire for application of a wear resistant coating to a workpiece, said wire having a metal sheath swaged around, and thereby compacting and confining, a core of a particulate mixture containing carbon, titanium and at least one other metal, the amount of titanium being from 8 to 24% of the total weight of all the metal in the wire and the amount of carbon being at least sufficient to react with substantially all the titanium to form titanium carbide, whereby upon the wire being heated substantially all the titanium in the core reacts with carbon in the core to form titanium carbide and the other metal in the core alloys with the sheath metal to form a coating matrix in which the titanium carbide is present as a dispersed phase in an amount of from 10 to 30% by weight of the coating.

2. A composite wire as set forth in claim 1 wherein the titanium is present in said core as an alloy thereof containing at least 65% titanium.

3. A composite wire as set forth in claim 2 wherein said titanium alloy contains from 65 to 90% titanium, from 2 to 15% chromium and from 5 to 20% iron.

4. A composite wire as set forth in claim 1 wherein said titanium is present in said core as an alloy thereof and wherein the other metal in said core is present as a constituent of said alloy.

5. A composite wire as set forth in claim 1 wherein the titanium is present in said core as an alloy thereof and wherein said core contains at least one other metal which is not a constituent of said alloy.

6. A composite wire as set forth in claim 1 wherein the sheath is formed from a metal having a hardness not exceeding 100 on the Rockwell B Scale.

7. A composite wire as set forth in claim 6 wherein the other metal in the core upon alloying with the sheath metal results in a matrix of greater hardness than that of the metal from which the sheath is formed.

8. A composite wire as set forth in claim 6 wherein said sheath is formed from a strip of the metal to its swaged, core-surrounding shape.

9. A composite wire as set forth in claim 1 wherein the sheath is formed of a metal which is work hardened while being swaged around the core.

10. A composite wire as set forth in claim 1 wherein the carbon is present in the core only in the amount required stoichiometrically to react with substantially all the titanium to form the titanium carbide.

11. A composite wire as set forth in claim 1 wherein the amount of carbon in the core exceeds that required stoichiometrically to react with all the titanium to form the titanium carbide, the excess carbon present enriching the matrix metal in carbon.

12. A composite wire as set forth in claim 1 wherein the sheath constitutes from 50 to 85% of the wire and the core the remainder.

13. A method for making a composite wire as set forth in claim 1, 2, 3, 4, 5, 6, 7, 8, 9, 10, 11 or 12 comprising bending a metal strip to an elongated trough, metering the core mixture into the trough longitudinally thereof such that the core mixture is evenly distributed along the trough, and then swaging the trough to generally cylindrical shape around and against the core mixture to thereby form the sheath.

* * * * *